(12) United States Patent
Schenkyr

(10) Patent No.: US 7,743,170 B2
(45) Date of Patent: Jun. 22, 2010

(54) ACTIVE TAP FOR DIRECTING DISTRIBUTION OF DATA OVER DATA TRANSMISSION NETWORK

(75) Inventor: Rainer Schenkyr, Schlierbach (DE)

(73) Assignee: Hirschmann Electronic GmbH & Co. KG, Neckartenzlingen (DE)

(*) Notice: Subject to any disclaimer, the term of this patent is extended or adjusted under 35 U.S.C. 154(b) by 1068 days.

(21) Appl. No.: 10/433,154

(22) PCT Filed: Nov. 23, 2001

(86) PCT No.: PCT/EP01/13645

§ 371 (c)(1),
(2), (4) Date: Oct. 8, 2003

(87) PCT Pub. No.: WO02/46932

PCT Pub. Date: Jun. 13, 2002

(65) Prior Publication Data
US 2004/0059838 A1    Mar. 25, 2004

(30) Foreign Application Priority Data
Dec. 5, 2000  (DE) ............... 100 60 607
Sep. 22, 2001 (DE) ............... 101 46 864

(51) Int. Cl.
*G06F 15/16* (2006.01)
(52) U.S. Cl. ............ 709/253; 370/254; 370/502; 333/109
(58) Field of Classification Search ........ 370/352, 370/389, 502, 254, 395.52, 293; 725/106, 725/149, 76; 717/100; 398/98; 709/223; 379/413; 700/83; 333/109, 131; 340/825; 327/108
See application file for complete search history.

(56) References Cited

U.S. PATENT DOCUMENTS

| | | | | | |
|---|---|---|---|---|---|
| 4,556,881 | A | * | 12/1985 | Basile | 340/825 |
| 4,633,202 | A | * | 12/1986 | Basile et al. | 333/109 |
| 4,748,617 | A | * | 5/1988 | Drewlo | 398/98 |
| 5,058,198 | A | * | 10/1991 | Rocci et al. | 725/149 |
| 5,396,197 | A | * | 3/1995 | Esker et al. | 333/131 |
| 5,729,824 | A | * | 3/1998 | O'Neill et al. | 725/106 |
| 5,745,159 | A | * | 4/1998 | Wax et al. | 725/76 |
| 5,978,578 | A | * | 11/1999 | Azarya et al. | 717/100 |

(Continued)

FOREIGN PATENT DOCUMENTS

EP       1340128       9/2003

(Continued)

OTHER PUBLICATIONS

Swales, A., "Topology Considerations for Modbus/Ethernet Automation Networks", http://www.lancontrols.com/into/TopologyConsideration.htm, Mar. 28, 2000, pp. 1-7.

(Continued)

*Primary Examiner*—Dustin Nguyen
(74) *Attorney, Agent, or Firm*—Fulbright & Jaworski L.L.P.

(57) ABSTRACT

The present invention for data distribution relates to a network wherein a distributor, which may be an Ethernet switch, is used in combination with active taps and programmable logic controllers to increase data transfer speeds and the volumes of transmission using active branching elements, i.e., active taps, that are interconnected via a bus line.

5 Claims, 1 Drawing Sheet

U.S. PATENT DOCUMENTS

| | | | |
|---|---|---|---|
| 6,115,468 A * | 9/2000 | De Nicolo | 379/413 |
| 6,175,556 B1 * | 1/2001 | Allen, Jr. et al. | 370/293 |
| 6,452,923 B1 * | 9/2002 | Gerszberg et al. | 370/352 |
| 6,480,510 B1 * | 11/2002 | Binder | 370/502 |
| 6,487,177 B1 * | 11/2002 | Weston-Dawkes | 370/254 |
| 6,643,292 B2 * | 11/2003 | Chapman et al. | 370/395.52 |
| 6,720,801 B2 * | 4/2004 | Houlberg | 327/108 |
| 6,853,867 B1 * | 2/2005 | Klindt et al. | 700/83 |
| 6,963,563 B1 * | 11/2005 | Wong et al. | 370/389 |

FOREIGN PATENT DOCUMENTS

| WO | WO 0020935 | 4/2000 |
|---|---|---|

OTHER PUBLICATIONS

Potter, D. "Using Ethernet for Industrial I/O and Data Acquisition", IMTC/99 Proceeding of the 16$^{th}$ IEEE Instrumentation and Measurement Technology Conference, May 24-26, 1999, pp. 1492-1496, vol. 3, Venice, IT.

GE FANUC Automation Product Brochure, "Versamax SE Ethernet Bridge", http://www.geindustrial.com/products/brochures/GFA-226.pdf>, retrieved from internet Sep. 25, 2002.

GE FANUC Automation, "Ethernet Connection via the serial port on a PLC", http://www.engineeringtalk.com/news/gef/gef122.html>, Oct. 13, 2000, pp. 1-2.

* cited by examiner

ACTIVE TAP FOR DIRECTING DISTRIBUTION OF DATA OVER DATA TRANSMISSION NETWORK

BACKGROUND OF THE INVENTION

1. Field of the Invention

The present invention relates to a network for distribution of data, and more particularly to a network including a programmable logic controller with at least one input/output unit that are interconnected with a distributor, e.g., and Ethernet switch, and active taps using a bus line.

2. Description of the Related Technology

Field bus systems (such as a profibus or an actuator/sensor interface bus) are conventionally used for communications between programmable logic controllers (SPS) and input/output units in industry, for example within a machine These field bus systems can be implemented in two ways.

First, each terminal device, e.g., input/output unit, can have two connection points for a field bus connection, cabling thus taking place directly from device to device, and one of the devices being connected to a programmable logic controller. The second possibility is for the field bus to have a main line from which so-called branch points are located at corresponding connection points for terminal devices, each respective terminal device being connected to its pertinent branch point.

These field bus systems have proven themselves in practice. However, these field bus systems have a maximum possible transmission rate of only up to 10 megabits per second, this processing speed and the resulting data volume is no longer adequate for current applications. The low transmission rates are due to the fact that interfaces of terminal devices or branch points are built passively, so that an increase in the amount of transmitted data or the processing speed is not possible with these components.

SUMMARY OF THE INVENTION

An object of the present invention is to devise an effective network for interconnection of at least one programmable logic controller with at least one input/output unit that works reliably to provide high data transmission rates in rugged industrial environments.

The present invention provides that at least one programmable logic controller is connected to a distributor, especially to an Ethernet switch or other terminal device (for example, a Personal Computer (PC)), and via at least one active tap to at least one input/output unit that is connected to the distributor. As a result of this combination with the active tap, increased amounts of data can be transmitted and processed in a shorter time than would be possible with passive taps. Furthermore, the distributor is able to organize an entire data stream which flows between the respective input/output units and at least one programmable logic controller. To do this in an especially advantageous manner, at least one distributor either is made such that it sends data to a certain active tap or receives data from it or that it sends addressed data to the bus line and the respective active tap receives the data provided with its address. The same applies vice versa, i.e. at a respective active tap to which at least one terminal device (e.g., input/output unit) is connected, data is addressed and sent to the pertinent programmable logic controller via the distributor.

With one such network, as a result of the active construction of taps and distributor, such as an Ethernet switch, especially high transmission speeds (for example, up to 100 megabits per second) can be achieved. The active tap moreover has the advantage that in interplay with the distributor it can replace the existing field bus with its passive taps. Thus, in an especially advantageous manner existing field bus networking can be replaced by Ethernet networking without new terminal devices or programmable logic controllers being necessary.

An embodiment of the invention has the respective active taps having at least three terminals each. Via a first terminal the active tap is connected to the distributor or to another active tap. A distributor or another active tap then can be connected likewise to a second terminal. Then the respective terminal device (e.g., input/output unit) is connected to a third terminal. Such a terminal device is not necessarily an input/output unit, but it is likewise possible that the connection is to only one sensor or only one actuator. Thus, star-like networking arrangements, or optionally several networks, are possible.

For another embodiment of the invention, the terminals of the respective active tap are provided with quick connect connector technology. In addition to the known plug connections which are in use, quick connect technology is beneficial since quick connect technology is less complex and is easier to handle. While plug connections are designed to break the respective contact-closure, for example when the network is modified, and to re-establish connections again, the quick connect technology is generally implemented only once, especially when the network is installed. Since only one-time contact closure is necessary, this can be easier (for example by insulation piercing contact-closure) so that material costs and installation costs can be kept low.

BRIEF DESCRIPTION OF THE DRAWINGS

An embodiment for a network according to the present invention, but to which the invention is not limited, is described below using the shown FIGURE.

DETAILED DESCRIPTION

Figure 1:
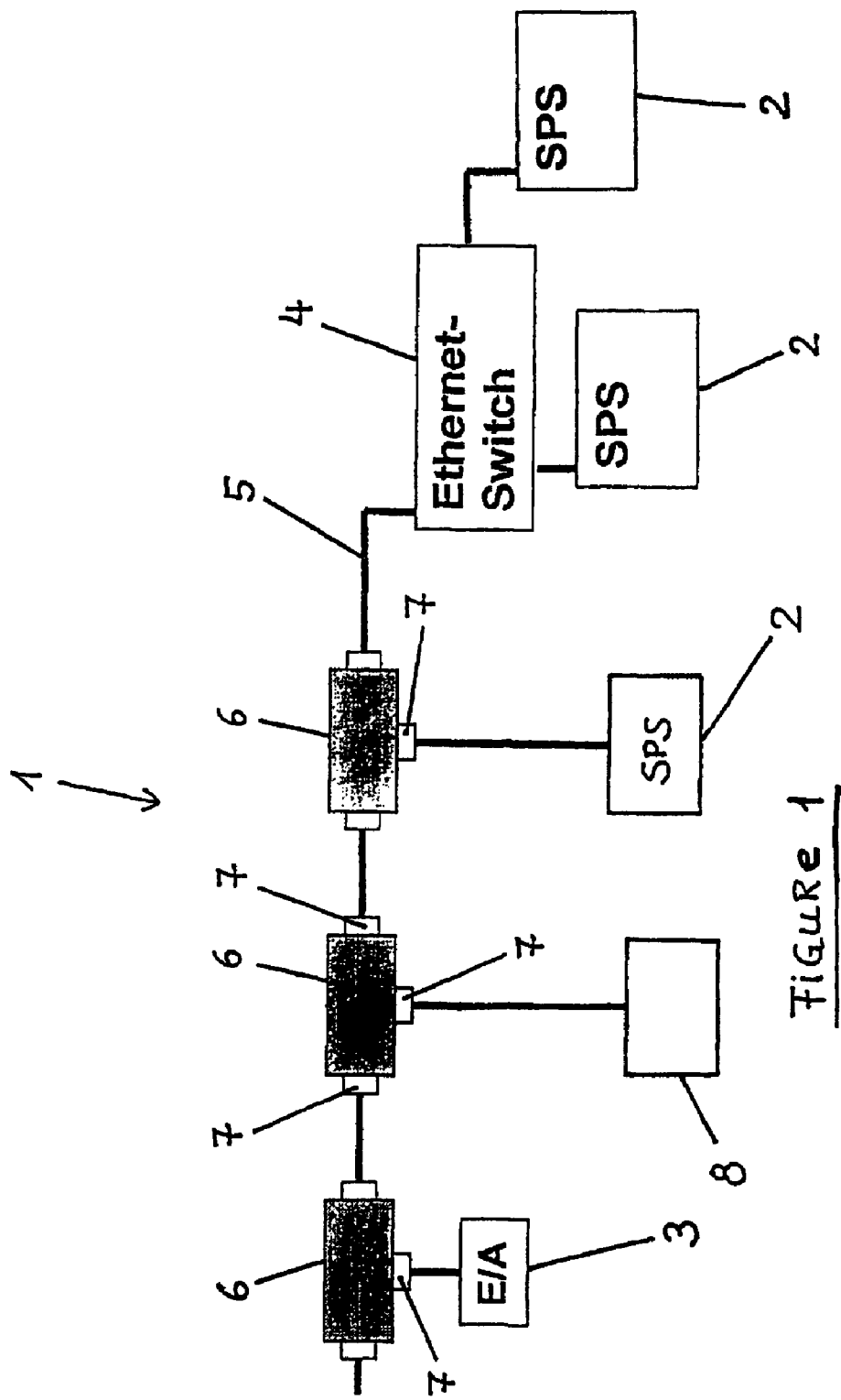
FIG. 1 shows a block diagram for a network to distribute data according to an embodiment for the present invention.

Reference number 1 labels a network which includes an Ethernet switch or distributor 4, and networks 1 is of a so-called Ethernet network type. At least one programmable logic controller 2 (SPS) (generally there being more than one such controller) and at least one input/output unit 3 (generally there being more than one such unit) are components of the network 1. A programmable logic controller 2 is shown in FIG. 1 as being directly connected to distributor 4. A bus line 5 leads from the distributor 4, and optionally also several bus lines 5 can be connected to the distributor 4, via active taps 6, to respective input/output units 3. A bus terminal can be connected to a last active tap 6 or can be integrated with pertinent active taps 6. The active taps 6 for the embodiment shown here each have terminals 7, and the individual active taps 6 also can have a different number of terminals 7. The first active tap 6 is connected with its first terminal 7 via the bus line 5 to the distributor 4 which is a switch, e.g., and Ethernet switch, or a programmable logic controller (SPS) or any terminal device (for example, a personal computer (PC)), while a second terminal 7 is connected to another active tap 6. The third terminal 7 of the first active tap 6 is connected to another SPS 2 unit. For example, a sensor (or actuator) 8 is connected to the second active tap 6 and an input/output (E/A) unit 3 is connected to the last shown active tap 6. There also can be more or fewer than three active taps 6. The terminals 7 can be made in an especially advantageous manner by incorporating quick connect connector technology. Moreover, all of the components or some of the components of the network 1 can be designed according to protective technology (e.g., IP 65/67 protective technology). A supply of power for the active taps 6 can be provided via the bus line 5, proceeding from the distributor 4 which can have an integrated power supply (power pack). Alternatively it also is conceivable to feed power into the bus line 5 via at least one feed point so the active taps 6 are supplied with voltage and current. This arrangement has the advantage that the bus line 5 is used for both power supply and data transmission so that the installation and integration of a separate power supply line is eliminated. Separation of the bus line 5 and power supply also is conceivable. For example, at least one active tap 6 or several or all active taps 6 also can have their own power supplies.

The invention claimed is:

1. An active tap for a data transmission network, wherein the data transmission network comprises a bus line, at least one programmable logic controller connected to a distributor, said distributor connected to said bus line to send data from said programmable logic controller that is addressed to said active tap, and a plurality of terminal devices that are connected to the bus line, wherein the active tap comprises:

a first connection that connects the tap to the bus line;

a second connection that connects the tap to one terminal device of the plurality of terminal devices; and a third connection that connects the tap to the bus line;

wherein the first, second, and third connections facilitates the active tap to receive data addressed to the active tap, send data over the bus line, and pass through data not addressed to the active tap;

wherein at least one of the first, second, third connections is disposed to connect the active tap to a power supply; and wherein said distributor receives data addressed to said distributor from said active tap.

2. The active tap according to claim 1, wherein the first connection disposed receives power from said bus line.

3. The active tap according to claim 1, wherein said distributor is an Ethernet switch.

4. The active tap according to claim 3 wherein said active tap operates with data in an Ethernet data format.

5. The active tap according to claim 1, wherein each of said three connections include a quick-connect connector.

* * * * *